United States Patent
Jinmei et al.

(10) Patent No.: US 7,386,725 B2
(45) Date of Patent: Jun. 10, 2008

(54) NODE DEVICE AND COMMUNICATION CONTROL METHOD FOR IMPROVING SECURITY OF PACKET COMMUNICATIONS

(75) Inventors: Tatuya Jinmei, Kanagawa (JP); Masahiro Ishiyama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 818 days.

(21) Appl. No.: 10/329,370

(22) Filed: Dec. 27, 2002

(65) Prior Publication Data

US 2003/0126429 A1 Jul. 3, 2003

(30) Foreign Application Priority Data

Dec. 28, 2001 (JP) ............................ P2001-401852

(51) Int. Cl.
*H04L 9/16* (2006.01)
(52) U.S. Cl. .................... 713/171; 713/151; 726/14
(58) Field of Classification Search ................ None
See application file for complete search history.

(56) References Cited

U.S. PATENT DOCUMENTS 6,907,532 B2 * 6/2005 Jari et al. ................. 726/15
2003/0018908 A1 * 1/2003 Mercer et al. ............ 713/193

OTHER PUBLICATIONS

Doraswamy et al., "IPSec—The New Security Standard for the Internet, Intranets, and Virtual Private Networks", Chapter 4, pp. 1-16, 1999.*
Spencer et al., "IKE Implementation Issues <draft-spencer-ipsec-ike-implementation-01.txt>", Nov. 21, 2001, obtained from http://tools.ietf.org/html/draft-spencer-ipsec-ike-implementation-01.*
D. Harkins, et al. "The Internet Key Exchange (IKE)," Internet Engineering Task Force, Request for Comments 2409, Nov. 1998, pp. 1-41.

* cited by examiner

*Primary Examiner*—Emmanuel L. Moise
*Assistant Examiner*—Jeffrey D. Popham
(74) *Attorney, Agent, or Firm*—Oblon, Spivak, McClelland, Maier & Neustadt, P.C.

(57) ABSTRACT

At a node device, after an exchange procedure for exchanging a security association information is carried out, the security association information is stored in a memory unit while a management information including the destination address, the identification information, and an information regarding a valid period of the security association information is stored in a non-volatile medium, such that it is possible to recover the normal state quickly without damaging the safety, when a temporary operation trouble occurs at one node under an environment in which a plurality of nodes are carrying out communications safely by using a prescribed security protocol.

4 Claims, 9 Drawing Sheets

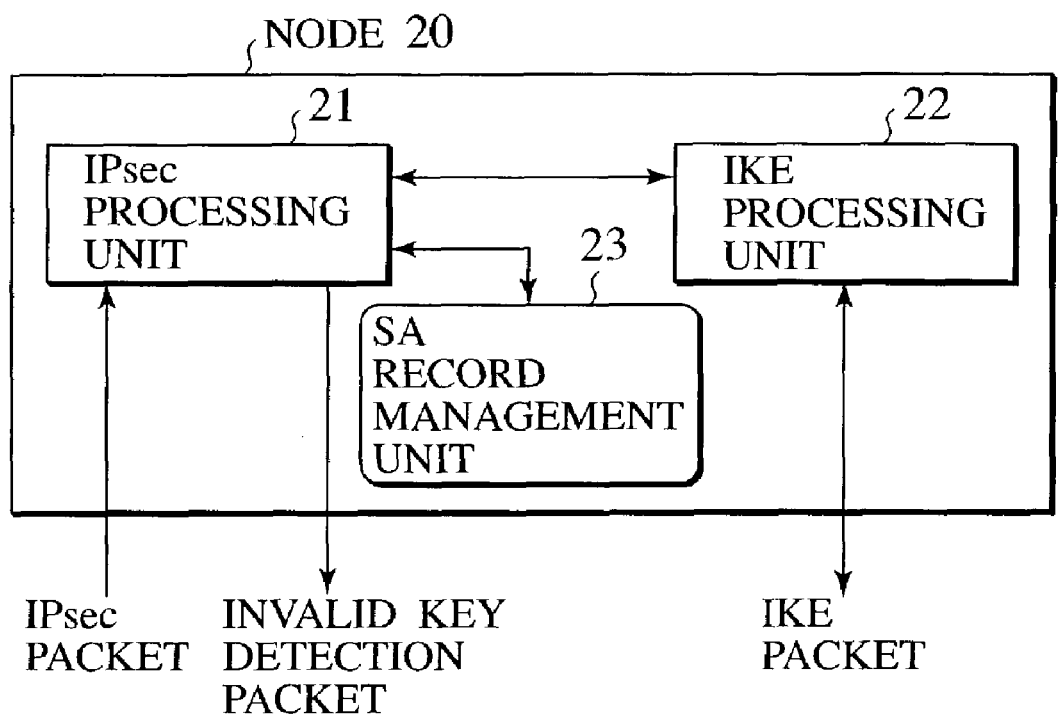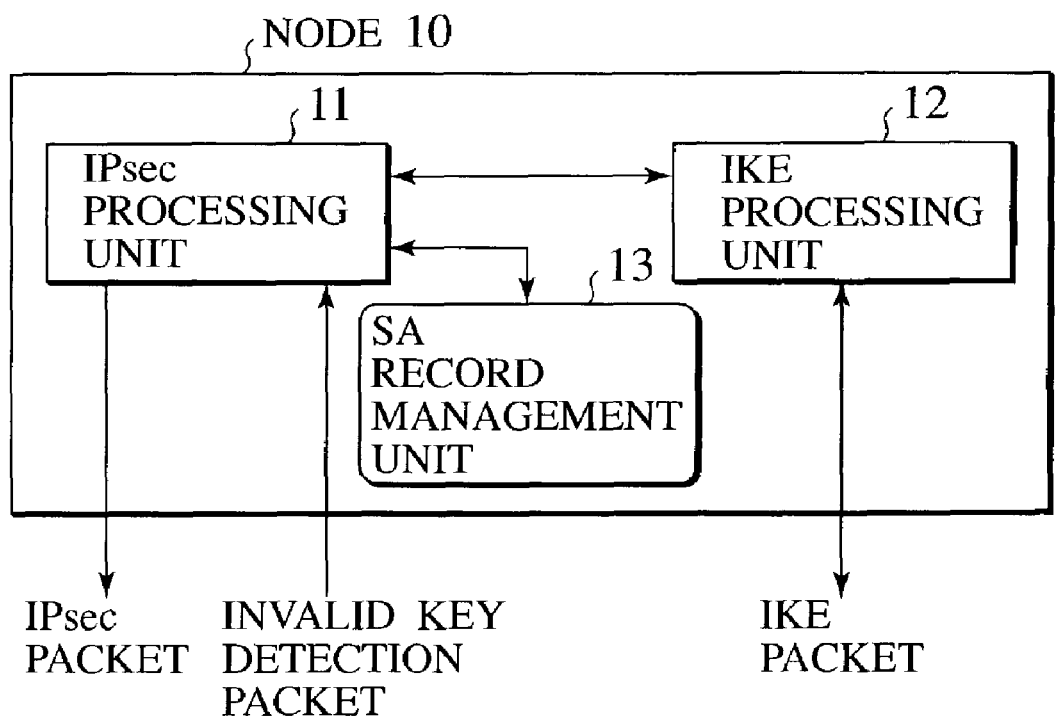

FIG.4A

| SPI | DESTINATION ADDRESS | VALID PERIOD |
|---|---|---|
|  |  |  |
|  |  |  |
|  |  |  |

FIG.4B

| SPI | DESTINATION ADDRESS | PARAMETER SUCH AS KEY INFORMATION |
|---|---|---|
|  |  |  |
|  |  |  |
|  |  |  |

NODE DEVICE AND COMMUNICATION CONTROL METHOD FOR IMPROVING SECURITY OF PACKET COMMUNICATIONS

BACKGROUND OF THE INVENTION

1. Field of the Invention

The present invention relates to a node device and a communication control method for carrying out packet transfer.

2. Description of the Related Art

As the user classes of the Internet expand, the utilization methods of the Internet are also widening. As for the user classes, the users who do not have special technical knowledges are increasing, and as for the utilization methods, the applications that require high safety such as purchases through the WWW and accesses to bank accounts are spreading.

In order to enable even the users who do not have special techniques to use such applications safely, there are propositions for a framework to provide the safety in the network. Among them, there is a technique called IPsec (IP security) (see RFC 2401). The IPsec is a protocol for exchanging IP packets by encrypting them, and includes ESP (IP Encapsulating Security Payload) for providing the confidentiality, AH (IP Authentication Header) for providing integrity and authentication, and IKE (Internet Key Exchange) for exchanging parameters to be used by ESP and AH between nodes.

In the IPsec, the basic requirements regarding the security such as the authentication and the encryption are realized at the network layer, so that there is an advantage that there is no need to add the security function to the individual application.

Between the nodes utilizing the IPsec, information called security association (SA) is shared in order to realize the authentication and the encryption. The security association information (abbreviated as SA hereafter) contains various parameters such as a destination information (destination address), an identification number (Security Parameter Index (SPI)), a key information and a valid period information (lifetime, for example).

A node that is a transmitting side of the packet can uniquely identify the corresponding SA from a set of the destination address (address of a node that is a receiving side of the packet) and the SPI. A node that is a receiving side can uniquely identify the corresponding SA from the SPI. The SPI needs to be unique for the identical destination, so that the SPI is determined by the node that is the receiving side. As such, the SA has a sense of direction so that in order for the packet using the security protocol to go and return, two SAs are necessary for a pair of nodes.

The outline of the processing at the nodes on the transmitting side and the receiving side are as follows. Namely, after the exchange of the SA is completed, the transmitting side node applies a prescribed cryptographic processing (encryption, for example) utilizing a prescribed key (secret key, for example) to the packet according to the SA corresponding to the destination and the SPI. The transmitting side node then transmits the IP packet containing an IPsec header where the SPI is described in a SPI field of this IPsec header. When the IP packet containing the IPsec header is received, the receiving side node obtains the corresponding SA from the SPI described in the SPI field of the IPsec header, and applies a prescribed processing (decryption, for example) utilizing a prescribed key (secret key, for example) to the packet according to that SA. Note that if the corresponding SA does not exist at the receiving side node, the received IP packet will be discarded.

On the other hand, the standard protocol for exchanging the SA between nodes utilizing the IPsec and updating the SA regularly (according to the valid period of the SA) is the IKE (Internet Key Exchange). In the IKE, a node that becomes a side for starting the communication is called an initiator, and a node that becomes a side for responding to it is called a responder. The SA is essentially a unidirectional information, but in the case of exchange using the IKE, the bidirectional SA is always established.

Here, the case of carrying out the communication using the IPsec between two nodes, after the exchange and sharing of the SA by the IKE are completed, will be considered.

For example, as shown in FIG. 10A, suppose that the exchange of the SA by the IKE is completed such that the SA with the destination=R and the SPI=100 is shared between a node (initiator node) 1001 and a node (responder node) 1002. Then, as shown in FIG. 10B, the node 1001 has the SA corresponding to the destination=R and the SPI=100 so that the node 1001 can transmit the IP packet in which a prescribed portion of the packet is encrypted according to that SA and data indicating the SPI=100 is described in the SPI field of the IPsec header. On the other hand, as shown in FIG. 10C, the node 1002 that received the IP packet containing the IPsec header with the SPI=100 has the SA with the SPI=100, so that the node 1002 can decrypts the prescribed portion of the packet according to that SA.

Here, suppose that a fault (which can be a fault due to the hardware or the fault doe to the software) occurs in the receiving side (responder side) node 1002, and this node 1002 is recovered after losing all the SAs utilized by the communications until then, as shown in FIG. 11A. Conventionally, there is no mechanism for detecting the fault of the receiving side node 1002 at the transmitting side (initiator side) node 1001. For this reason, even after the fault occurred, the node 1001 that has the SA corresponding to the SPI=100 continues the communication according to the IPsec using that SA, as shown in FIG. 11B. However, at the node 1002, the SA corresponding to the SPI=100 is lost, so that the received packet is discarded as shown in FIG. 11C. As a result, effectively the communication cannot be established until the valid period of this SA expires.

As a method for handling such a situation, it is possible to consider the method in which the SA data are stored in a stable recording device such as hard disk at a stage where the exchange and sharing of the SA by the IKE are completed, and the SA is revived by utilizing the SA data stored in the stable recording device after the receiving side node is recovered from the fault. However, this method requires to record even the key information to be kept secret in the stable recording device, so that it is very inconvenient in that a possibility for the leakage of the key information increases.

As another handling method, it is possible to consider the method in which, when the SA corresponding to the SPI of the received packet does not exist at the receiving side node, a notification message indicating this fact is returned from the receiving side node to the transmitting side node. However, this method has the following drawbacks.

(1) By giving a packet having arbitrary SPI to the receiving side node and observing the reaction of the receiving side node to it, it becomes possible to check from the external whether the receiving side node has the SA corresponding to that SPI that was given to the receiving side node.

(2) It becomes possible to make an attack for blocking the communication by giving a fake message indicating the SA is lost to the transmitting side node that is communicating normally.

(3) When the authentication is applied to the above described notification message in order to prevent the attack of (2), it becomes possible to make an attack for causing the increase of the processing load on the receiving side node due to the authentication operation at a time of transmitting the notification message, by giving packets having arbitrary SPI to the receiving side node.

Thus, according to the conventional methods, it has been difficult to recover the normal state quickly without damaging the safety when the SA is lost at the responder side of the IKE. Namely, the method for storing the SA at a time of its generation has a possibility for the leakage of the secret. Also, the method for notifying the fact that the SA is lost to the initiator side has a possibility for the leakage of the information and the attacks for blocking the communication or increasing the processing load.

BRIEF SUMMARY OF THE INVENTION

It is therefore an object of the present invention to provide a node device and a communication control method capable of recovering the normal state quickly without damaging the safety, when a temporary operation trouble occurs at one node under an environment in which a plurality of nodes are carrying out communications safely by using a prescribed security protocol through the Internet or the like.

According to one aspect of the present invention there is provided a node device, comprising: an exchange procedure processing unit configured to carry out an exchange procedure for exchanging a security association information including a destination address of a packet communication, an identification information of the destination address that is unique to the destination address, and a parameter information regarding a cryptographic processing to be used in the packet communication, with a node that becomes a correspondent of the packet communication according to a prescribed protocol, prior to the packet communication; a memory unit configured to store the security association information exchanged by the exchange procedure; a management unit configured to store and manage a management information including the destination address, the identification information, and an information regarding a valid period of the security association information, for each security association information stored in the memory unit, in a non-volatile medium; and a packet processing unit configured to transmit a notification message containing the destination address and the identification information to the node that becomes the correspondent, when the security association information specified by the destination address that indicates the node device itself and the identification information that are contained in a header of a received packet destined to the node device according the prescribed security protocol does not exist as a valid security association information and the management information corresponding to that security association information exists as a valid management information in the non-volatile medium, in order to notify this fact to the node that becomes the correspondent.

According to another aspect of the present invention there is provided a communication control method for a node device for carrying out a packet communication with another node device, comprising: carrying out an exchange procedure for exchanging a security association information including a destination address of the packet communication, an identification information of the destination address that is unique to the destination address, and a parameter information regarding a cryptographic processing to be used in the packet communication, with the another node device that becomes a correspondent of the packet communication according to a prescribed protocol, prior to the packet communication; storing the security association information exchanged by the exchange procedure in an internal memory device, and storing a management information including the destination address, the identification information, and an information regarding a valid period of the security association information, for each security association information stored in the internal memory device, in a non-volatile medium; receiving a packet destined to the node device according to the prescribed security protocol from the another node device; and transmitting a notification message containing the destination address and the identification information to the another node device, when the security association information specified by the destination address that indicates the node device itself and the identification information that are contained in a header of a received packet does not exist as a valid security association information and the management information corresponding to that security association information exists as a valid management information in the non-volatile medium, in order to notify this fact to the another node device.

According to another aspect of the present invention there is provided a communication control method for a first node device and a second node device that carry out a packet communication, comprising: carrying out an exchange procedure for exchanging a security association information including a destination address of the packet communication, an identification information of the destination address that is unique to the destination address, and a parameter information regarding a cryptographic processing to be used in the packet communication, between the first node device and the second node device according to a prescribed protocol, prior to the packet communication; storing the security association information exchanged by the exchange procedure in an internal memory device of each one of the first node device and the second node device, and storing a management information including the destination address, the identification information, and an information regarding a valid period of the security association information, for each security association information stored in the internal memory device, in a non-volatile medium at least at the second node device; producing a packet according to the prescribed security protocol according to the parameter information regarding the cryptographic processing contained in the security association information at the first node device, and transmitting the packet to the second node device; receiving the packet destined to the another node device according to the prescribed security protocol from the first node device at the second node device; carrying out another exchanging procedure for exchanging the security association information including the destination address of the packet communication according to a notification message, the identification information of the destination address that is unique to the destination address, and the parameter information regarding the cryptographic processing to be used in the packet communication, prior to transmitting the notification message containing the destination address and the identification information to the first node device; producing another packet according to the prescribed security protocol that contains the notification message according to the parameter information regarding the cryptographic processing contained in the security association information at the second node device, and transmitting the another packet to the first node device; receiving the another packet according to the prescribed security protocol that contains the notification message from the second node device at the first node device; and verifying an authenticity of the notification message, and if the authenticity of the notification message is verified, deleting the security association information specified by the destination address and the identification information contained in the notification message, at the first node device.

According to another aspect of the present invention there is provided a computer program product for causing a computer to function as a node device, the computer program product comprising: a first computer program code for causing the computer to carry out an exchange procedure for exchanging a security association information including a destination address of a packet communication, an identification information of the destination address that is unique to the destination address, and a parameter information regarding a cryptographic processing to be used in the packet communication, with a node that becomes a correspondent of the packet communication according to a prescribed protocol, prior to the packet communication; a second computer program code for causing the computer to store the security association information exchanged by the exchange procedure; a third computer program code for causing the computer to store and manage a management information including the destination address, the identification information, and an information regarding a valid period of the security association information, for each security association information stored by the second computer program code, in a non-volatile medium; and a fourth computer program code for causing the computer to transmit a notification message containing the destination address and the identification information to the node that becomes the correspondent, when the security association information specified by the destination address that indicates the node device itself and the identification information that are contained in a header of a received packet destined to the node device according the prescribed security protocol does not exist as a valid security association information and the management information corresponding to that security association information exists as a valid management information in the non-volatile medium, in order to notify this fact to the node that becomes the correspondent.

Other features and advantages of the present invention will become apparent from the following description taken in conjunction with the accompanying drawings.

BRIEF DESCRIPTION OF THE DRAWINGS

FIG. 2 is a block diagram showing an exemplary configuration of a receiving side node in the communication system of FIG. 1.

FIG. 3 is a block diagram showing an exemplary configuration of a transmitting side node in the communication system of FIG. 1.

FIGS. 4A and 4B are diagrams showing an exemplary format of an SA record management information stored in an SA record management unit and an SA information stored in an SA information storage unit in one embodiment of the present invention.

DETAILED DESCRIPTION OF THE INVENTION

Referring now to FIG. 1 to FIGS. 9A, 9B and 9C, one embodiment of the present invention will be described in detail.

In this embodiment, the exemplary case of using the IPsec (and the IKE). Also, in this embodiment, basically the same procedure is applied to the case where the security protocol is the ESP and the case where the security protocol is the AH, except that the content of the specific cryptographic processing is to be changed, so that the security protocols are not particularly distinguished in the following description. Also, in this embodiment, the exemplary case of using the key information as the parameter of the SA will be described.

In the following, the SA for a set of SPI=I and destination address=addr will be denoted as SA(I, addr). Also, the secret key for the IPsec to be utilized by one SA=S will be denoted as key(S). For example, the secret key for the IPsec to be utilized by the SA for a set of SPI=I and destination address=addr will be denoted as key (SA(I, addr)).

Figure 1:
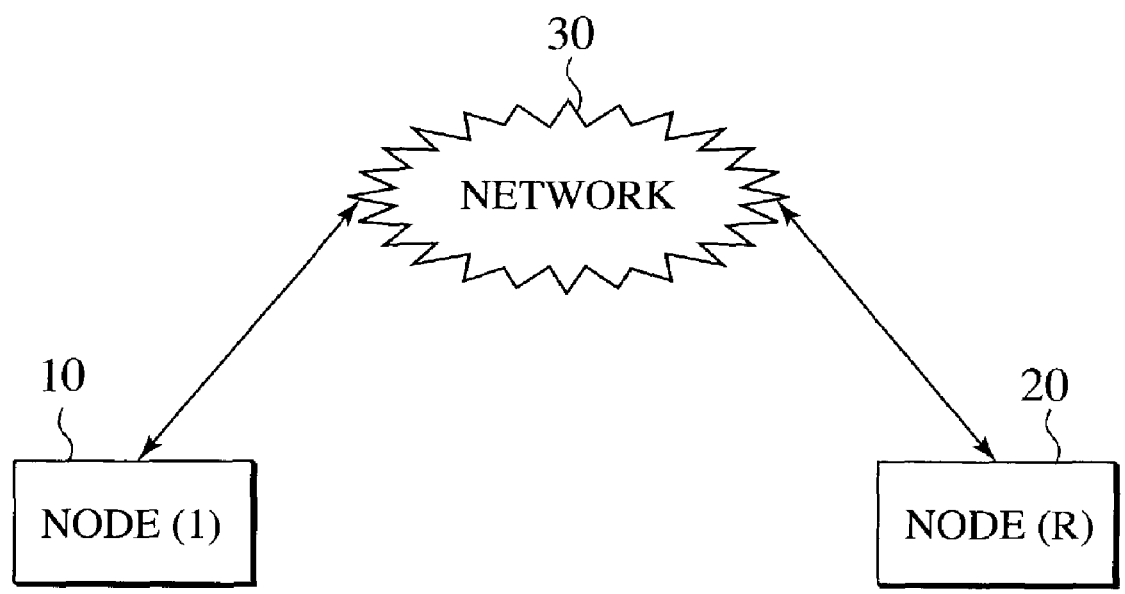
FIG. 1 is a schematic diagram showing an exemplary configuration of a communication system according to one embodiment of the present invention.

FIG. 1 shows an exemplary configuration of a communication system according to one embodiment of the present invention.

In FIG. 1, a node 10 and a node 20 are connected through a network 30. In this embodiment, the exemplary case of carrying out the packet communications by utilizing the IKE and the IPsec where the node 10 is a transmitting side and the node 20 is a receiving side (the node 10 is an initiator side and the node 20 is a responder side with regard to the IKE) will be mainly described.

The network 30 can be a WAN such as the Internet or a LAN such as an enterprise network or a home network, or a network system in which WAN and LAN coexist. Also, the network 30 can be an entirely wired network or an entirely radio network, or a network system in which wired network and radio network coexist.

FIG. 1 shows only two nodes, but the other nodes may also exist.

Here, it is assumed that the node 10 has address=I1, and the node 20 has address=R1.

FIG. 2 shows an exemplary configuration of the node 20 according to this embodiment. As shown in FIG. 2, the node 20 has an IPsec processing unit 21, an IKE processing unit 22, and an SA record management unit 23. The node 20 also has an SA information storage unit (not shown). In FIG. 2, directions of arrows for the packets are depicted for the case where the node 20 becomes a receiving side.

FIG. 3 shows an exemplary configuration of the node 10 according to this embodiment. As shown in FIG. 3, the node 10 has an IPsec processing unit 11, an IKE processing unit 12, and an SA record management unit 13. The node 10 also has an SA information storage unit (not shown). In FIG. 3, directions of arrows for the packets are depicted for the case where the node 10 becomes a transmitting side.

Each of the nodes 10 and 20 has a function of an SA record management/invalid key detection and notification in the case it becomes the receiving side node, and a function of an SA deletion upon receiving the invalid key detection message in the case it becomes the transmitting side node, in addition to the functions of the conventional node.

Note that each of the nodes 10 and 20 may not carry out the storing of the SA record management information by using the SA record management unit for those SAs to be used for the communications in which it becomes the transmitting side, or may carry out the storing of the SA record management information by using the SA record management unit for those SAs to be used for the communications in which it becomes the transmitting side. In this embodiment, for the sake of simplicity, the former case will be described (in which case, the SA record management unit of the node 10 is used only when the node 10 becomes the receiving side).

It is also possible to implement the node with only the functions required for the transmitting side or only the functions required for the receiving side.

Next, the SA record management unit 23 of the node 20 when it becomes the receiving side will be described. The SA record management unit 13 of the node 10 when it becomes the receiving side is the same.

The SA record management unit 23 is formed by a non-volatile medium for storing data constantly regardless of whether the node is re-activated or not (one from which the data recorded on the medium can be recovered even after the fault such as a power disconnection or a node hung up, which can be a non-volatile memory such as a flash memory, an external memory device such as a hard disk device, etc., for example), and stores SPI=1, destination address =addr, and a valid period of SA(I, addr) for each SA in correspondence. Thus, the SA record management unit 23 does not store the secret key or the like.

Note that the SA record management unit 23 may store a set of the SPI and the valid period in the case where the SAs with this node as their destination are to be the management target.

Also, the SA record management unit 23 may store the set of the SPI, the destination address and the valid period (or the set of the SPI and the valid period) in a data server through LAN, for example, and acquire the stored set from that server.

On the other hand, the SA information storage unit is formed by an internal memory device (RAM, for example) which becomes a state of not storing the data it stored before the fault occurs at the node 20, after the re-activation, and stores each SA.

FIG. 4A shows an exemplary format of the SA record management information stored in the SA record management unit 23, and FIG. 4B shows an exemplary format of the SA information stored in the SA information storage unit.

In the following, the operation in this embodiment will be described. Note that, in the following, the exemplary case of using the secret key as the parameter of the SA will be described.

Figure 5:
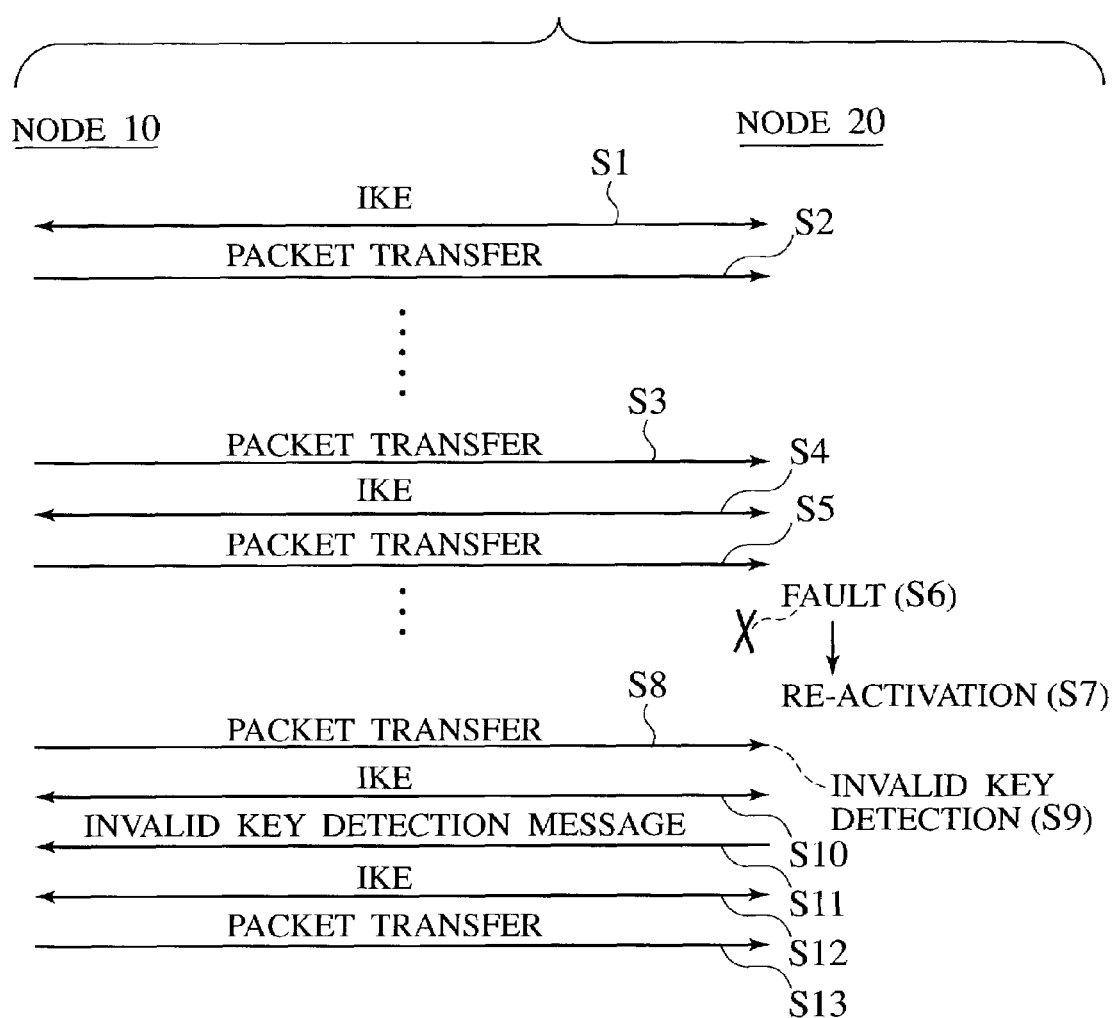
FIG. 5 is a sequence chart for a processing to transfer IPsec packets after carrying out an IKE procedure between nodes in one embodiment of the present invention.
Figure 6:
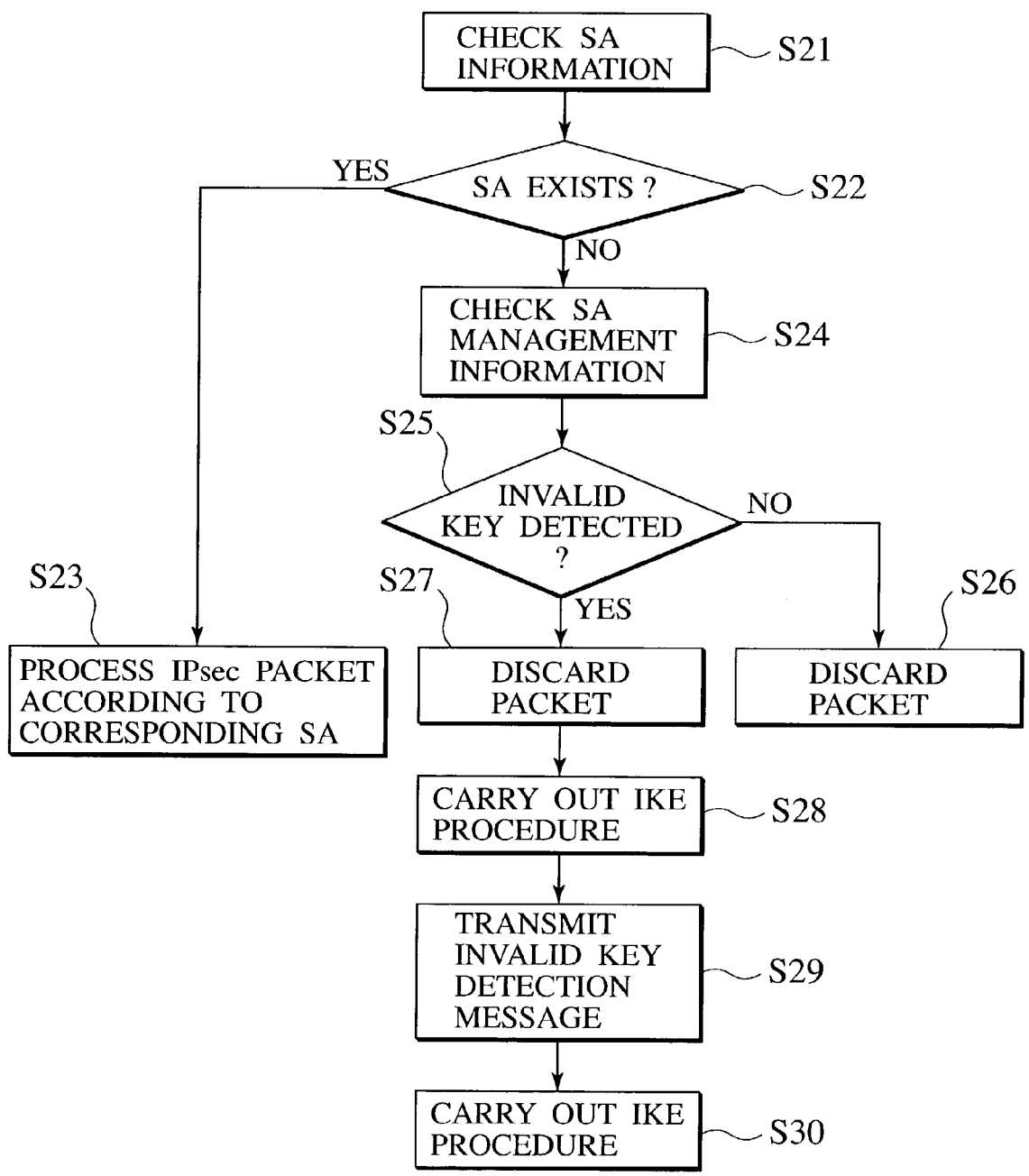
FIG. 6 is a flow chart showing an exemplary processing procedure in the case where a receiving side node receives an IPsec packet in one embodiment of the present invention.
Figure 7:
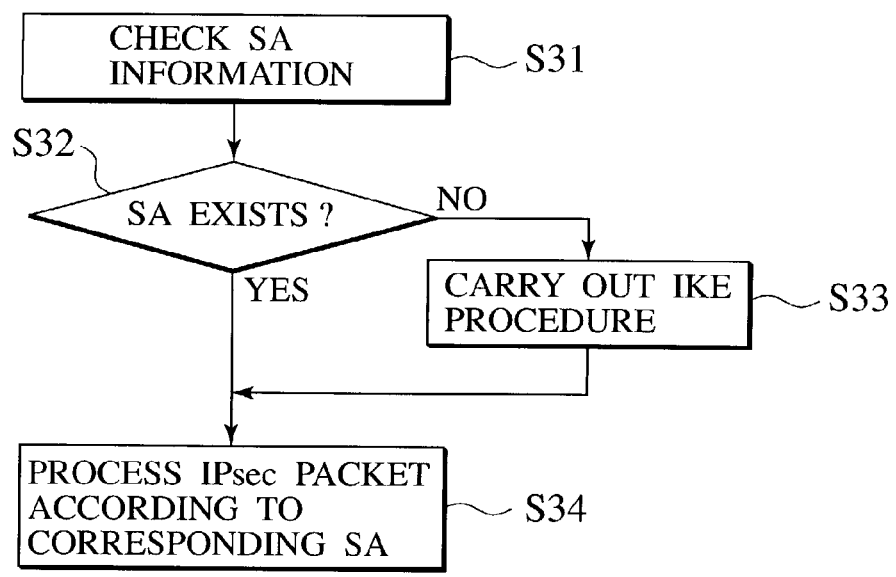
FIG. 7 is a flow chart showing an exemplary processing procedure in the case where a transmitting side node transmits an IPsec packet in one embodiment of the present invention.
Figure 8:
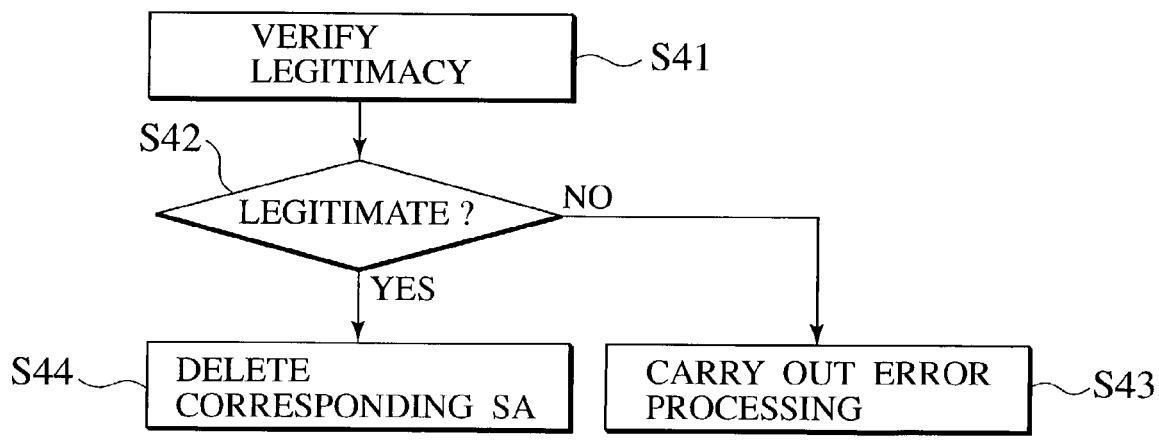
FIG. 8 is a flow chart showing an exemplary processing procedure in the case where a transmitting side node receives an invalid key detection message in one embodiment of the present invention.

FIG. 5 shows an exemplary sequence in this embodiment, and FIG. 6 shows an exemplary processing procedure in the case where the node 20 that is the receiving side receives the IPsec packet. Also, FIG. 7 shows an exemplary processing procedure in the case where the node 10 that is the transmitting side transmits the IPsec packet, and FIG. 8 shows an exemplary processing procedure in the case where the node 10 that is the transmitting side receives an invalid key detection message.

At a time of transmitting the IPsec packet toward the receiving side node 20, the transmitting side node 10 checks whether the corresponding SA exists or not (S31), and if it does not exist (S32), the IKE procedure is carried out (S33).

When the node 10 starts the communication toward the node 20, the SA does not exist yet, so that by the initiative of the initiator side node 10 (S31, S32), the key exchange procedure according to the IKE will be carried out between the node 10 and the node 20 (S1, S33).

As a result of this IKE procedure, SA(I1, R) as an SA of the IPsec for the starting point address I and the destination address R (it is assumed that SPI=I1), and the secret key key(SA(I1, R)) corresponding to it are generated.

At that point, the responder side node 20 records a set of SPI=I1, destination address=R, and the valid period of SA(I1, R) into the SA record management unit 23 (which is a non-volatile medium). On the other hand, the entire SA that contains the secret key, etc., is recorded into the SA information storage unit, and utilized for the actual communications using the IPsec.

Then, after the SA is established between the node 10 and the node 20, until the valid period of that SA expires, the packet transfer according to the IPsec by using that SA is carried out between the transmitting side node 10 and the receiving side node 20 (S31/S32/S34, S2/S3, S21/S22/S23).

Also, between the node 10 and the node 20, the SA is regularly updated by the IKE, and the IPsec packet transfer is carried out by using the updated SA (S4, S5).

Figure 9A:
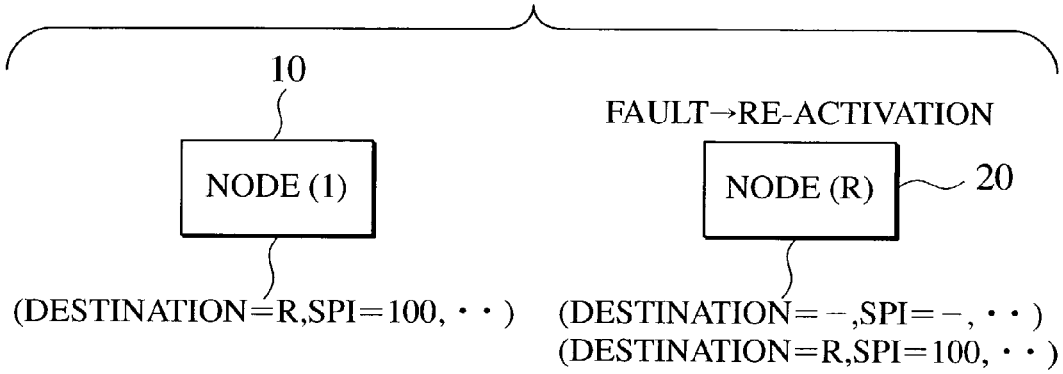
FIGS. 9A, 9B and 9C are schematic diagrams showing an exemplary IPsec packet transfer between nodes in one embodiment of the present invention.

Here, at some stage after the SA is established between the node 10 and the node 20 until the valid period expires, suppose that some fault occurred at the receiving side node 20 (S6), and then recovered and the node 20 is re-activated (S7). Then, in this embodiment, when the receiving side node 20 is re-activated, the SA information recorded in the SA information storage unit is lost but the SA record management information stored in the SA record management unit 23 is still stored. This situation is shown in FIG. 9A. Note that, in FIGS. 9A, 9B and 9C, it is assumed that destination=R and SPI=100 as a concrete example.

Figure 9B:
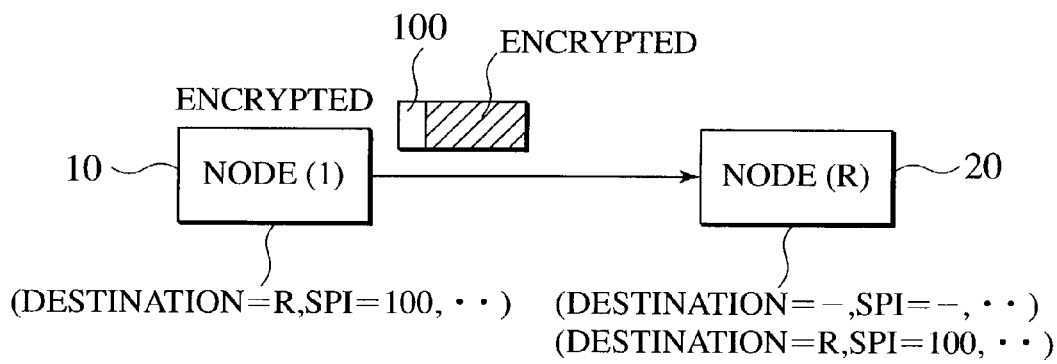

Now, the node 10 does not recognize that the node 20 has lost the SA (I1, R) as it is re-activated, so that even after the re-activation of the node 20, the node 10 continue to transmit the packet with the IPsec processing applied by using the SA (I1, R) to the node 20 (S31/S32/S34, S8). This situation is shown in FIG. 9B.

Next, the IPsec processing unit 21 of the node 20 which received that packet checks whether SA(I1, R) corresponding to SPI=I1 and destination address=R is stored in the SA information storage unit or not (S21), and if it is stored, the received packet is processed by using that SA (S22, S23), whereas if it is not stored, the set of (I1, R) is notified to the SA record management unit 23 (S24). Note that, in the case where SAs with this node as their destination are to be the management target, it is also possible to notify only I1 to the SA record management unit 23.

Figure 9C:
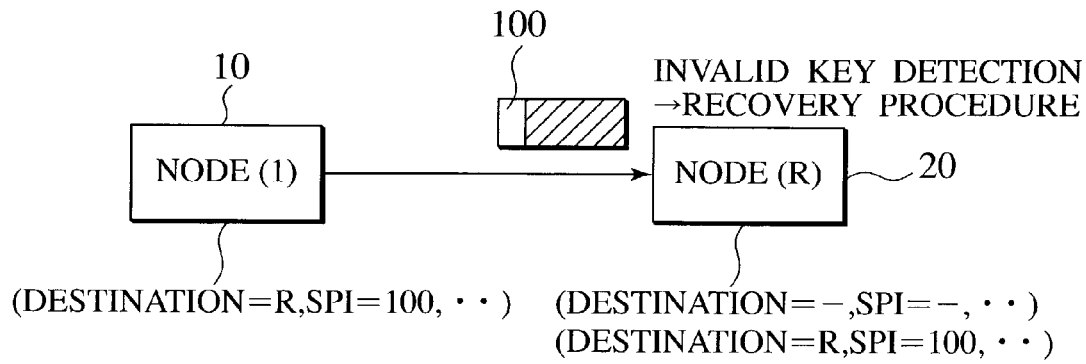
Figure 10A:
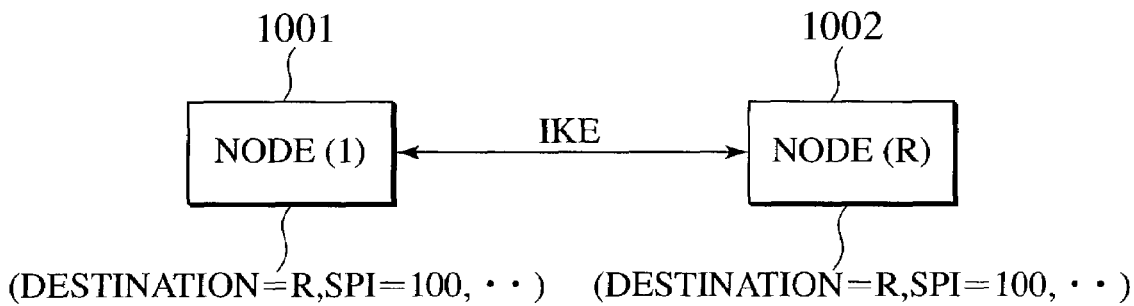
FIGS. 10A, 10B and 10C are schematic diagrams showing one exemplary conventional IPsec packet transfer between nodes.
Figure 10B:
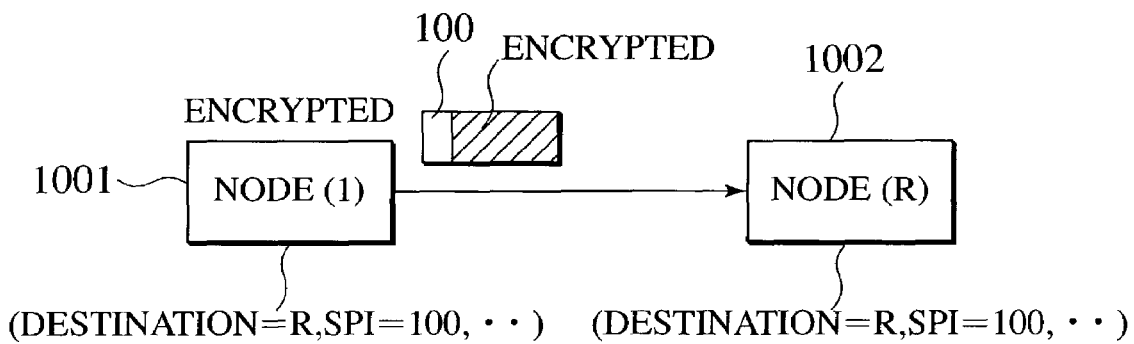
Figure 10C:
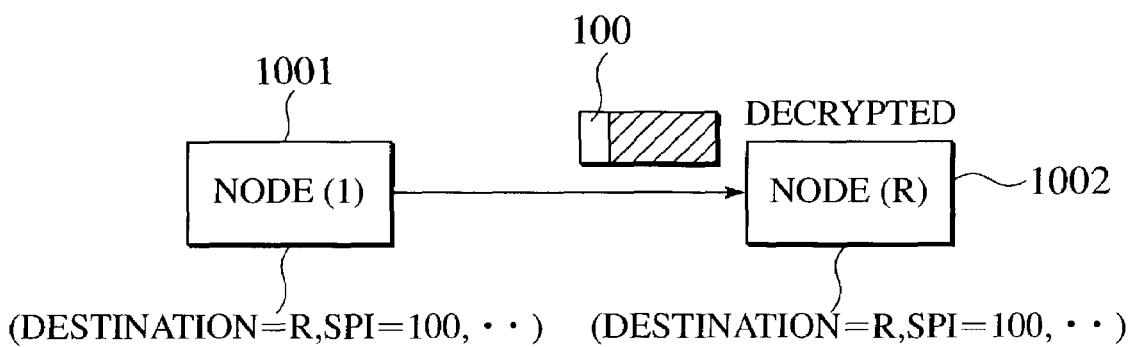
Figure 11A:
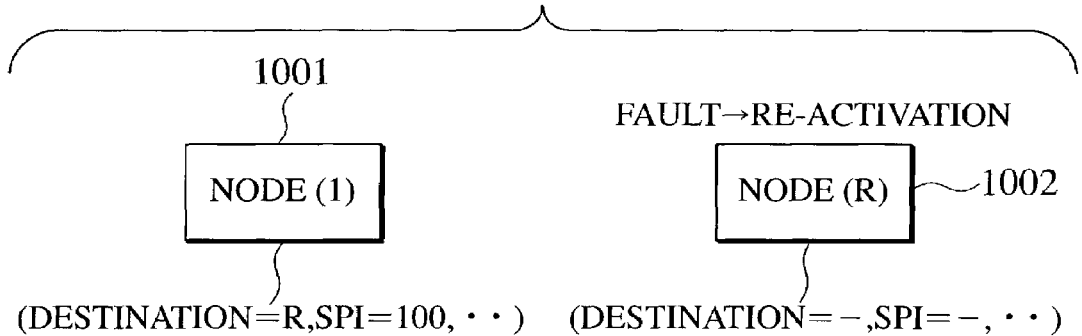
FIGS. 11A, 11B and 11C are schematic diagrams showing another exemplary conventional IPsec packet transfer between nodes.
Figure 11B:
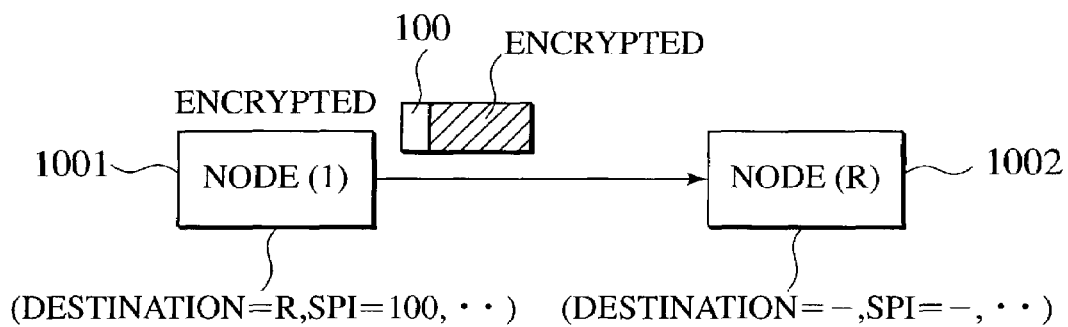
Figure 11C:
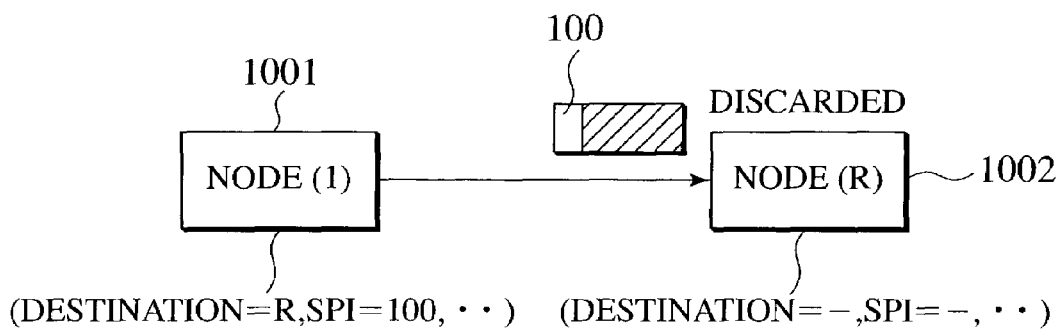

The SA record management unit 23 checks whether an entry corresponding to (I1, R) (or an entry corresponding to I1) which is still within its valid period exists in the list or SAs generated in past including those generated before the re-activation or not (S24). In this exemplary case, SA(I1, R) corresponds to this entry and it is still within its valid period, so that an invalid key (a key that is not stored despite of the fact that the SA is still within its valid period) is detected (S9, S25). This situation is shown in FIG. 9C.

Note that regardless of whether the invalid key is detected or not (S25), the received IPsec packet for which the corresponding SA does not exist will be discarded (S26, S27). Also, the timing for discarding the packet is arbitrary (it may be carried out before notifying the SA record management unit 23, or after notifying the SA record management unit 23).

Also, when the SA information of the SA information storage unit is checked and the corresponding SA does not exist, it is possible to refer the SA record management information of the SA record management unit 23, or it is possible to refer both the SA information of the SA information storage unit and the SA record management information of the SA record management unit 23 simultaneously and classify the case as one of "the corresponding SA exists", "the invalid key detected", and "others".

Now, in this embodiment, the responder side node 20 that detected the invalid key (S25) transmits the invalid key detection message for notifying the detection of the invalid key to the initiator side node 10, and in order to guarantee the authenticity of this invalid key detection message, this message itself is protected by the IPsec. However, at this stage, the effective SA still does not exist between the node 10 and the node 20, so that first, the SA exchange procedure according to the IKE is carried out in order to transfer the invalid key detection message (S10, S28). As a result, SA(R1, I) as an SA of the IPsec for the starting point address R and the destination address I (it is assumed that SPI=R1), and the secret key key(SA(R1, I)) corresponding to it are generated.

At that point, the node 10 may record a set of SPI=R1, destination address=I, and the valid period of SA(R1, I) into the SA record management unit 13 (which is a non-volatile medium), similarly as the responder side of the IKE for the packet communication, but instead of that, the node 10 may not record the set of the SPI, the destination address and the valid period into the SA record management unit 13, for those SAs that are established by the IKE for the purpose of the transfer of the invalid key detection message. In the latter case, the fact that it is the IKE for the transfer of the invalid key detection message is notified from the node 20 to the node 10 such that the above set is not recorded at the node 10, or the valid period of the SA is set to be less than a prescribed reference value and the above set is not recorded for the SA with the valid period less than the reference value, for example.

Next, the node 20 produces the invalid key detection message containing the set (I1, R) such that the corresponding SA can be detected at the node 10 side, and transmits the newly generated SA(R1, I) in a form protected by using the IPsec, to the node 10 (S11, S29).

When this invalid key detection message is received, the node 10 first verifies the authenticity of that message at the IPsec processing unit 11 (S41), and when the authenticity is verified (S42), the node 10 deletes SA(I1. R) which is the SA corresponding to SPI=I1 and destination address=R contained in that message, as invalid (S44). When the authenticity is not verified (S42), the error processing is carried out to discard this message or to record the fact that unauthentic message was received (S43).

Then, when the node 10 transmits the packet toward the node 20 after the above SA is deleted, the corresponding SA does not exist (S31, S32), so that the key exchange procedure according to the IKE is carried out again (S33, S12, S30).

As a result, SA(I2, R) as an SA of the IPsec for the starting point address I and the destination address R (it is assumed that SPI=I2), and the secret key key (SA(I2, R)) corresponding to it are generated.

At that point, the responder side node 20 records a set of SPI=I2, destination address=R, and the valid period of SA(I2, R) into the SA record management unit 23 (which is a non-volatile medium), similarly as in the above. On the other hand, the entire SA that contains the secret key, etc., is recorded into the SA information storage unit (by using a main memory or the like), and utilized for the actual communications using the IPsec.

Then, after the SA(I2, R) is newly established, the packet transfers according to the IPsec by using that SA(I2, R) is carried out between the transmitting side node 10 and the receiving side node 20 (S31/S32/S34, S13, S21/S22/S23).

Thereafter, the SA is regularly updated according to the need, and also the processing as described above is carried out when the node 20 is re-activated, according to the need.

As described, according to this embodiment, even when the SA established earlier is lost as the fault occurred at the responder side node of the IKE, it is possible to recover the normal state quickly without increasing the risk from a security viewpoint after the node is recovered and re-activated. Also, at the responder side, it suffices to store the SPI and the destination address into the SA record management unit 23 (which is a non-volatile medium), and there is no need to store the secret key. The SPI and the destination address are information that can easily be acquired by monitoring the packets during the communication. so that the risk from a security viewpoint due to the separate storing of these is minor.

Also, the responder side detects the invalid key and just transmits the invalid key detection message, only in the case where the SPI and the destination address of the received IPsec packet coincide with the SPI and the destination address stored in the SA record management unit 23 and the corresponding SA is not stored, so that the above described problem (1) does not arise, and the attach for increasing the processing load of the above described problem (3) can be avoided. On the other hand, the invalid key detection message is protected by the IPsec so that the attack for blocking of the above described problem (2) can also be avoided.

On the other hand, the recovery processing utilizing the invalid key detection message starts immediately after the initiator side node transmitted the first packet after the re-activation of the responder side node. For this reason, the discarding of the packet due to the non-existence of the SA at the responder side is carried out only during a period until the SA to be used for the invalid key detection message transmission is established by the IKE and the invalid key detection message is processed at the initiator side. This is sufficiently short period of time compared with the lifetime of the SA in general, so that it implies that the recovery to the normal state is possible quickly.

Now, in the example described above, the IKE is carried out solely for the purpose of the transfer of the invalid key detection message, and after that, the IKE for the purpose of the data transfer is carried out again. However, if the security policy at the nodes permits, it is possible to replace these two IKE procedures by a single IKE procedure. In the following, such a case will be described.

Here, the case in which the communication between the node 10 and the node 20 is the bidirectional communication such as TCP in the example described above will be considered. Moreover, the case in which this communication is operated such that both a direction from the node 10 to the node 20 and a direction from the node 20 to the node 10 are protected by the IPsec will be considered. In such a case, suppose that the fault occurred at the responder side node 20, and then recovered and the node 20 is re-activated, and two new SAs SA(R1, I) and SA (I2, R) are newly established by the IKE, similarly as in the earlier example.

The node 20 produces the invalid key detection message, and transmits it in a form protected according to the IPsec by using SA(R1, I), to the node 10.

Then, if the security policy on the node 20 permits, thereafter the node 20 can transmit the IPsec packets by using this already established SA(R1, I) to the node 10. In this case, the node 10 deletes SA(R1, I), and thereafter the node 10 can transmit the IPsec packets by using SA(I2, R) to the node 20.

In this case, the SA established for transmitting the invalid key detection message can be utilized for the subsequent packet communication, so that there is also an advantage that the task for establishing the SA by utilizing the IKE in order to transmit the invalid key detection message is effectively not increasing the processing load of the node (it is a light load).

In the case of operating the IPsec, it is customary to apply the policy that is both symmetrical and bidirectional for the initiator side and the responder side, so that the SA established for the invalid key detection message is most likely still utilizable in the subsequent communication.

Thus, according to the present invention, it is possible to provide a node device and a communication control method capable of recovering the normal state quickly without damaging the safety, when a temporary operation trouble occurs at one node under an environment in which a plurality of nodes are carrying out communications safely by using a prescribed security protocol through the Internet or the like.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each node of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A node device, comprising:

an exchange procedure processing unit configured to carry out an exchange procedure for exchanging a security association information including a destination address of a packet communication, an identification information of the destination address that is unique to the destination address, and a parameter information regarding a cryptographic processing to be used in the packet communication, with a node that becomes a correspondent of the packet communication according to a prescribed security protocol, prior to the packet communication;

a memory unit configured to store the security association information exchanged by the exchange procedure;

a management unit configured to store and manage a management information including the destination address, the identification information, and an information regarding a valid period of the security association information, for each security association information stored in the memory unit, in a non-volatile medium; and a packet processing unit configured to transmit a notification message containing the destination address and the identification information to the node that becomes the correspondent, when the security association information specified by the destination address that indicates the node device itself and the identification information that are contained in a header of a received packet destined to the node device according to the prescribed security protocol does not exist as a valid security association information and the management information corresponding to that security association information exists as a valid management information in the non-volatile medium, in order to notify this fact to the node that becomes the correspondent, wherein the exchange procedure processing unit exchanges the security association information with the node that becomes the correspondent as a destination, with the node that becomes the correspondent, prior to transmitting the notification message, the packet processing unit produces a packet according to the prescribed security protocol that contains the notification message according to the parameter information regarding the cryptographic processing that is contained in the security association information exchanged by the exchange procedure, and transmits the packet to the node that becomes the correspondent, and the exchange procedure processing unit also carries out another exchange procedure for the security association information solely for a purpose of transmitting the notification message, prior to transmitting the notification message.

2. A communication control method for a node device for carrying out a packet communication with another node device, comprising:

carrying out an exchange procedure for exchanging a security association information including a destination address of the packet communication, an identification information of the destination address that is unique to the destination address, and a parameter information regarding a cryptographic processing to be used in the packet communication, with the another node device that becomes a correspondent of the packet communication according to a prescribed security protocol, prior to the packet communication;

storing the security association information exchanged by the exchange procedure in an internal memory device, and storing a management information including the destination address, the identification information, and an information regarding a valid period of the security association information, for each security association information stored in the internal memory device, in a non-volatile medium;

receiving a packet destined to the node device according to the prescribed security protocol from the another node device;

transmitting a notification message containing the destination address and the identification information to the another node device, when the security association information specified by the destination address that indicates the node device itself and the identification information that are contained in a header of a received packet does not exist as a valid security association information and the management information corresponding to that security association information exists as a valid management information in the non-volatile medium, in order to notify this fact to the another node device;

exchanging the security association information with the another node device as a destination, with the another node device, prior to transmitting the notification message; and producing a packet according to the prescribed security protocol that contains the notification message according to the parameter information regarding the cryptographic processing that is contained in the security association information exchanged by the exchanging step, and transmitting the packet to the another node device, wherein the exchanging step also carries out another exchange procedure for the security association information solely for a purpose of transmitting the notification message, prior to transmitting the notification message.

3. A communication control method for a first node device and a second node device that carry out a packet communication, comprising:

carrying out an exchange procedure for exchanging a security association information including a destination address of the packet communication, an identification information of the destination address that is unique to the destination address, and a parameter information regarding a cryptographic processing to be used in the packet communication, between the first node device and the second node device according to a prescribed security protocol, prior to the packet communication;

storing the security association information exchanged by the exchange procedure in an internal memory device of each one of the first node device and the second node device, and storing a management information including the destination address, the identification information, and an information regarding a valid period of the security association information, for each security association information stored in the internal memory device, in a non-volatile medium at least at the second node device;

producing a packet according to the prescribed security protocol according to the parameter information regarding the cryptographic processing contained in the security association information at the first node device, and transmitting the packet to the second node device;

receiving the packet transmitted to the second node device according to the prescribed security protocol from the first node device at the second node device;

carrying out another exchange procedure for exchanging the security association information including the destination address of the packet communication according to a notification message, the identification information of the destination address that is unique to the destination address, and the parameter information regarding the cryptographic processing to be used in the packet communication, prior to transmitting the notification message containing the destination address and the identification information to the first node device;

producing another packet according to the prescribed security protocol that contains the notification message according to the parameter information regarding the cryptographic processing contained in the security association information at the second node device, and transmitting the another packet to the first node device;

receiving the another packet according to the prescribed security protocol that contains the notification message from the second node device at the first node device; and verifying an authenticity of the notification message, and if the authenticity of the notification message is verified, deleting the security association information specified by the destination address and the identification information contained in the notification message, at the first node device, wherein the another exchange step also carries out yet another exchanging procedure for the security association information solely for a purpose of transmitting the notification message, prior to transmitting the notification message to the first node device.

4. A computer readable medium storing computer program instructions, which when executed by a computer, cause the computer to function as a node device by performing steps comprising:

exchanging a security association information including a destination address of a packet communication, an identification information of the destination address that is unique to the destination address, and a parameter information regarding a cryptographic processing to be used in the packet communication, with a node that becomes a correspondent of the packet communication according to a prescribed security protocol, prior to the packet communication;

storing the security association information exchanged by the exchange procedure;

storing and managing a management information including the destination address, the identification information, and an information regarding a valid period of the security association information, for each security association information stored in the preceding storing step, in a non-volatile medium; and transmitting a notification message containing the destination address and the identification information to the node that becomes the correspondent, when the security association information specified by the destination address that indicates the node device itself and the identification information that are contained in a header of a received packet destined to the node device according to the prescribed security protocol does not exist as a valid security association information and the management information corresponding to that security association information exists as a valid management information in the non-volatile medium, in order to notify this fact to the node that becomes the correspondent, said exchanging step comprising exchanging the security association information with the node that becomes the correspondent as a destination information with the node that becomes the correspondent as a destination, with the node that becomes the correspondent, prior to transmitting the notification message, said notification transmitting step comprising producing a packet according to the prescribed security protocol that contains the notification message according to the parameter information regarding the cryptographic processing that is contained in the security association information exchanged by the exchange procedure, and transmitting the packet to the node that becomes the correspondent, and said exchanging step further comprising performing another exchange procedure for the security association information solely for a purpose of transmitting the notification message, prior to transmitting the notification message.

* * * * *